United States Patent
Yuan et al.

(10) Patent No.: US 7,457,674 B2
(45) Date of Patent: Nov. 25, 2008

(54) SYSTEM, DEVICE, AND METHODS FOR UPDATING SYSTEM-MONITORING MODELS

(75) Inventors: Chao Yuan, Plainsboro, NJ (US); Claus Neubauer, Monmouth Junction, NJ (US); Zehra Cataltepe, Red Bank, NJ (US); Wesley McCorkle, Oviedo, FL (US); Hans-Gerd Brummel, Orlando, FL (US); Ming Fang, Princeton Junction, NJ (US)

(73) Assignees: Siemens Corporate Research, Inc., Princeton, NJ (US); Siemens Energy, Inc., Orlando, FL (US)

( * ) Notice: Subject to any disclaimer, the term of this patent is extended or adjusted under 35 U.S.C. 154(b) by 423 days.

(21) Appl. No.: 11/210,485

(22) Filed: Aug. 24, 2005

(65) Prior Publication Data
US 2006/0047512 A1 Mar. 2, 2006

Related U.S. Application Data

(60) Provisional application No. 60/605,346, filed on Aug. 27, 2004.

(51) Int. Cl.
*G05B 13/02* (2006.01)
(52) U.S. Cl. .................. 700/31; 700/29; 700/52
(58) Field of Classification Search .............. 700/31, 700/29, 30, 47, 52
See application file for complete search history.

(56) References Cited

U.S. PATENT DOCUMENTS

| | | | |
|---|---|---|---|
| 6,085,183 A | 7/2000 | Horn et al. | |
| 6,208,953 B1 | 3/2001 | Milek et al. | |
| 6,301,575 B1 | 10/2001 | Chadha et al. | |
| 6,393,387 B1 | 5/2002 | Adriaans et al. | |
| 6,804,642 B1 | 10/2004 | Naylor | |
| 6,904,588 B2 | 6/2005 | Reddy et al. | |
| 7,092,922 B2 * | 8/2006 | Meng et al. | 700/47 |
| 7,117,480 B2 * | 10/2006 | Andersh et al. | 717/120 |
| 2003/0046130 A1 * | 3/2003 | Golightly et al. | 705/7 |
| 2003/0083756 A1 | 5/2003 | Hsiung et al. | |
| 2003/0147351 A1 | 8/2003 | Greenlee | |

FOREIGN PATENT DOCUMENTS

WO WO 03/048876 A1 6/2003

* cited by examiner

*Primary Examiner*—Albert DeCady
*Assistant Examiner*—Steven R Garland (57) ABSTRACT

A system for updating a plurality of monitoring models is provided. The system includes a model association module that, for each of a plurality of monitored systems determines, an association between a particular monitored system and at least one of a plurality of estimation models. Each estimation model is based upon one of a plurality of distinct sets of estimation properties, and each set uniquely corresponds to a particular estimation model. The system also includes an updating module that updates at least one of the estimation properties and propagates the updated estimation properties to each estimation model that corresponds to a distinct set containing at least one estimation property that is updated. The system further includes a model modification module that modifies each estimation model that corresponds to a distinct set containing at least one estimation property that is updated.

14 Claims, 7 Drawing Sheets

|  | Model 1 | Model 2 | · · · | Model N |
|---|---|---|---|---|
| System 1 | 1 | 1 | · · · | 0 |
| System 2 | 1 | 1 | · · · | 1 |
| . | . | . | . | . |
| . | . | . | . | . |
| . | . | . | . | . |
| System M | 1 | 0 | · · · | 0 |

SYSTEM, DEVICE, AND METHODS FOR UPDATING SYSTEM-MONITORING MODELS

CROSS-REFERENCE TO RELATED APPLICATIONS

This application claims the priority of U.S. provisional patent application No. 60/605,346, titled "MODEL ASSOCIATION IN FLEET MONITORING SYSTEM FOR LARGE POWER PLANTS," filed Aug. 27, 2004.

FIELD OF THE INVENTION

The invention is related to the field of sensor-based monitoring, and, more particularly, to monitoring multi-element systems using multiple sensors.

BACKGROUND OF THE INVENTION

Multi-element systems such as a power generation plant can involve the complex integration of multiple elements cooperatively performing a variety of tasks in order to attain a desired output or goal. Owing to this complexity, the monitoring of such a system so as to prevent or mitigate a failure or less-than desired level of performance can itself be a complex task.

One monitoring technique in such an environment utilizes estimation models and sensors. According to this technique, the sensors generate signals from which are derived sensor vectors based on sensed measures of physical or other inputs to the system and outputs generated by the system in response to the inputs. The sensor vectors are initially used to statistically "train" the estimation model. The model provides a mathematical or statistical relationship between the inputs to the system and the corresponding outputs generated by the system. During subsequent monitoring of the system, raw data from the sensors are input into the model and compared with estimated values obtained by applying the model. A large deviation between actual values of the sensor data and the estimated values generated by the model can indicate that a system fault has occurred.

Sensor-based monitoring can be used in a variety of settings. Power generation plants, manufacturing processes, complex medical equipment, and a host of other systems and devices involving the coordinated functioning of a large number of interrelated components or processes can often be efficiently monitored and controlled through sensor-based monitoring. Indeed, sensor-based monitoring can be advantageously employed in virtually any environment in which various system-specific parameters need to be monitored over time under varying conditions.

An electrical power generation plant provides a useful example of a system that can efficiently employ sensor-based monitoring. Electrical power generation involves the complex integration of multiple power generation components that function cooperatively to generate electrical power. These components can include gas turbines, heat recovery steam generators, steam turbines, and electrical generators that in combination convert fuel-bound energy via mechanical energy into electrical energy. Important operating variables that should be closely monitored to assess the performance of the entire power plant, or one or more of its components such as a gas turbine, include pressure and temperature in various regions of the system as well as vibrations and other important parameters that reveal the condition of the equipment of the system.

Regardless of the environment in which sensor-based monitoring is utilized, the accuracy of the model employed can be a critical factor in whether the monitoring is accurate. A model's accuracy often times depends on whether the model is appropriately updated to reflect structural or other changes in the system monitored with the model. Additionally, new models may be developed that would enhance monitoring of a system. More than one model may be applied with respect to a monitored system.

The task of updating system-monitoring models is made more complex when more than one system is monitored on the basis of multiple models. If a property of an underlying model that applies to two or more systems is updated, then modifying each of the models in accordance with the updated property typically requires loading each model on one or more computing devices that perform the various model calculations for each particular system. Thus, updating estimation model properties and modification of estimation models in response to the updating typically must be performed with respect to each system separately.

Performing these tasks separately for an estimation model as it is applied to different systems can be an arduous, time consuming task for a diagnostic engineer or technician. This is especially so given that in many situations, engineers and technicians in diagnostic centers may be charged with monitoring hundreds of systems continuously or on a frequent basis. Accordingly, there is a need for a way to more effectively and efficiently update estimation properties and modify system-monitoring models in response to the updates when such estimation models are used in the monitoring of large numbers of systems.

SUMMARY OF THE INVENTION

The present invention provides a model association and a related mechanism for updating system-monitoring models across a large number of systems. The invention can be electronically implemented to effect savings in time and resources needed to update models applied to the various systems.

One embodiment of the invention is an electronically-implemented model association method for updating estimation models used for system monitoring. The method can include determining an association between a particular monitored system and at least one of a plurality of estimation models for each of a plurality of monitored systems. Each estimation model can be based upon one of a plurality of distinct sets of estimation properties, and each set can uniquely correspond to a particular estimation model.

The method can further include updating at least one of the estimation properties and propagating the at least one updated estimation property to each estimation model that corresponds to a distinct set containing the at least one estimation property that is updated. Additionally, the method can include modifying each estimation model that corresponds to a distinct set containing the at least one estimation property that is updated.

Another embodiment of the invention is a system for updating a plurality of monitoring models. The system can include a model association module that for each of a plurality of monitored systems determines an association between a particular monitored system and at least one of a plurality of estimation models, wherein each estimation model is based upon one of a plurality of distinct sets of estimation properties, and wherein each set uniquely corresponds to a particular estimation model.

Additionally, the system can include an updating module that updates at least one of the estimation properties and propagates the at least one updated estimation property to each estimation model that corresponds to a distinct set containing the at least one estimation property that is updated. The system further can include a model modification module that modifies each estimation model that corresponds to a distinct set containing the at least one estimation property that is updated.

Still another embodiment of the invention is a computer-readable storage medium comprising computer instructions. The computer instructions can include instructions for determining for each of a plurality of monitored systems an association between a particular monitored system and at least one of a plurality of estimation models. The computer instructions also can include updating at least one of the estimation properties.

The computer instructions further can include instructions for propagating at least one updated estimation property to each estimation model that corresponds to a distinct set containing the at least one estimation property that is updated. Additionally, the computer instructions can include instructions for modifying each estimation model that corresponds to a distinct set containing the at least one estimation property that is updated.

BRIEF DESCRIPTION OF THE DRAWINGS

There are shown in the drawings, embodiments which are presently preferred. It is to be understood, however, that the invention is not limited to the precise arrangements and instrumentalities shown.

DETAILED DESCRIPTION

Figure 1:
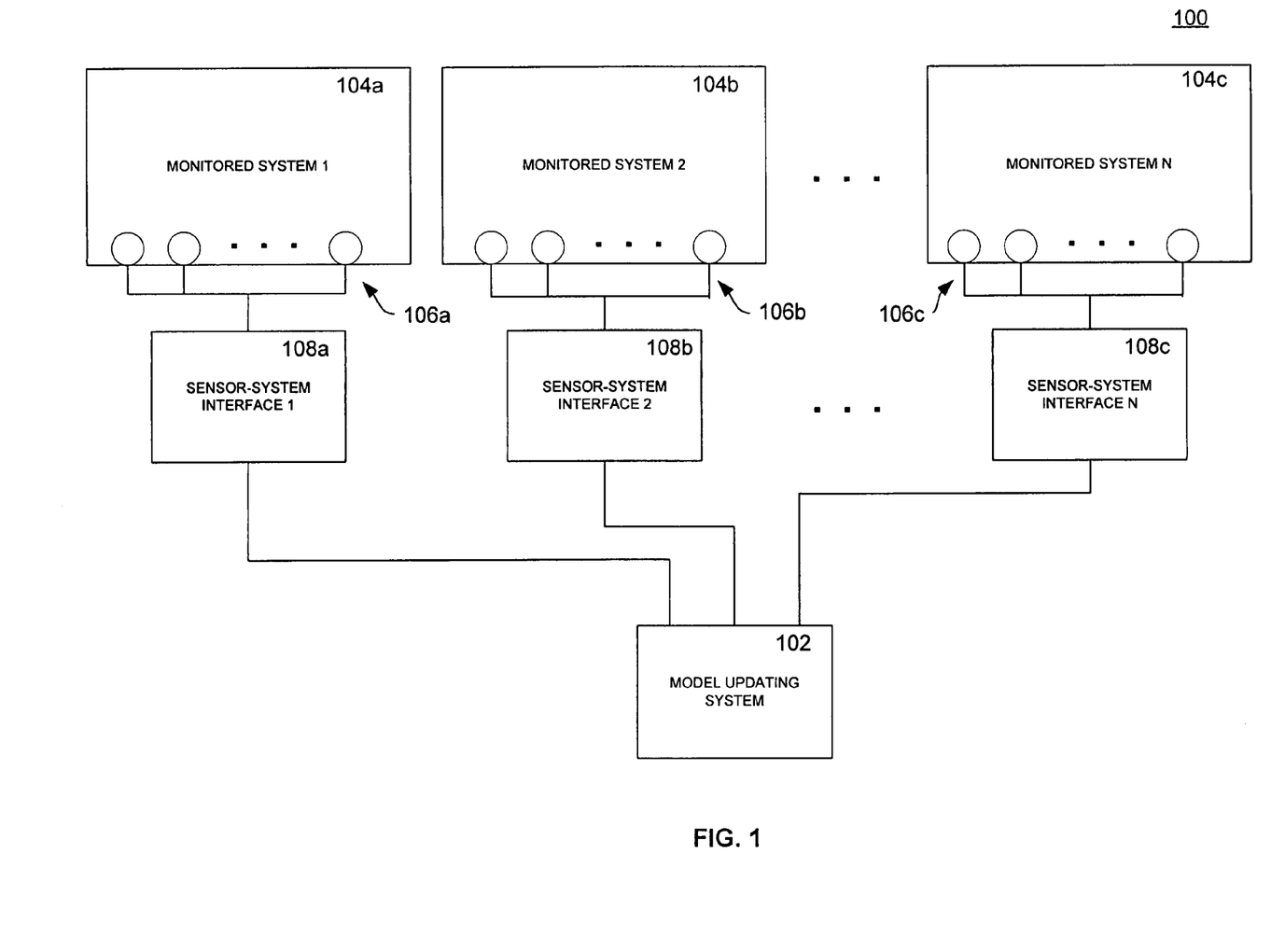
FIG. 1 is a schematic view of an exemplary environment in which is used a system for updating system monitoring models, according to one embodiment of the invention.

FIG. 1 is an exemplary environment 100 in which a system 102 for updating a plurality of monitoring models, according to one embodiment of the invention, can be used. The environment 100 includes a plurality of monitored systems 104a, 104b, 104c. Although three such monitored systems are explicitly shown, it is to be understood that in alternative embodiments the environment 100 can comprise more or fewer such monitored systems. The monitored systems 104a, 104b, 104c more particularly, can comprise power generation systems, processing plants, multi-component medical devices, or other such systems characterized by the cooperative functioning of multiple or complex components in the generation of one or more measurable outputs in response to one or more measurable inputs.

Each of the monitored systems 104a, 104b, 104c is illustratively monitored by a plurality of sensors 106a, 106b, 106c, respectively. The various sensors 106a, 106b, 106c can comprise transducers that generate electrical signal responses to various physical phenomena corresponding to the inputs and outputs of the respective systems. For example, in the context of power generation, if each of the monitored systems 104a, 104b, 104c comprises a power generation plant, sensor-measured output includes not only electrical power, but other outputs that are inevitable by-products of electrical power generation. The other outputs can include, for example, temperatures, pressures and vibrations of the main power generation components such as gas turbines, boilers, steam turbines, and electrical generators. In the same context, inputs to the power generation plant can include, for example, gas, air, and/or steam.

The response signals generated by each of the plurality of sensors 106a, 106b, 106c provide data, or sensor vectors, that can be used for monitoring and detecting faults in the monitored systems 104a, 104b, 104c. The sensor-generated signals can be processed to produce quantifiable data. For example, the sensor-generated signals can be digitized and manipulated by a digital signal processor to generate the sensor vectors. Other known processing techniques, including analog signal processing, can alternatively or additionally be used for generating quantifiable data corresponding to the operation of the monitored systems 104a, 104b, 104c.

The sensor vectors resulting from the sensor-generated signals are illustratively described here in the context of inferential sensing. Inferential sensing entails the construction of estimation models that mathematically or statistically model the operation of the monitored systems 104a, 104b, 104c. Such estimation models provide correlations among the various measured inputs and outputs of the monitored systems 104a, 104b, 104c. As will be readily understood by one of ordinary skill in the art, an estimation model generates estimated values that can be compared to actual values to determine one or more residuals and to ascertain acceptable ranges for the residuals. A fault is indicated if a residual determined during operation of a monitored system falls outside its acceptable range.

The models that can be used for such inferential system include standard regression models such as least squares as well as newer ones such as different variants of kernel regression models and ones based on neural networks. It will be apparent from the description herein that the system 102 according to the invention is not limited by the nature of the particular models used for monitoring the monitored systems 104a, 104b, 104c. Regardless of the particular model employed, construction of the model is typically accomplished during a training phase in which raw data is used to "train" a particular model for creation of sensor estimates, as will be understood by one of ordinary skill in the art. During a subsequent monitoring phase, newly-generated sensor data is input to the model or models so trained in order to detect faults in a corresponding one of the plurality of monitored systems 104a, 104b, 104c.

The system 102 is illustratively connected to a plurality of sensor-system interfaces 108a, 108b, 108c, which, in turn are each connected to a particular subset of the plurality of sensors 106a, 106b, 106 that monitor one of the plurality of monitored systems 104a, 104b, 104c. Sensor-generated signals are illustratively supplied by each of the plurality of sensors 106a, 106b, 106c to a corresponding one of the plurality of monitored systems 104a, 104b, 104c. The sensor-system interfaces 108a, 108b, 108c perform the function, already described, of converting the signals into quantifiable data. Accordingly, the sensor-system interfaces 108a, 108b, 108c can include one or more multiplexers for multiplexing a plurality of sensor-generated signals. The sensor-system interfaces 108a, 108b, 108c, according to still another embodiment, can comprise digital signal processors for processing digitized signals derived from the sensor-generated signals. In an alternative embodiment, these signal processing functions are performed by elements included within the system 102 itself. Moreover, the plurality of sensors 106a, 106b, 106 alternatively can connect directly to the system 102. According to any of these various embodiments, the processed signals are used to construct estimation models, as described above.

As schematically illustrated, the monitored systems 104a, 104b, 104c are remotely monitored by the system 102. Thus, the system can be located a distance away from the monitored systems at, for example, a diagnostic center (not shown) that is remote from the various systems that it monitors. With remote monitoring, the sensor vectors, which here comprise the operational data pertaining to the monitored systems 104a, 104b, 104c, are transferred to the system 102 continuously or, alternatively, in batch deliveries with each batch comprising data that encompasses the performance of a monitored system during the time since the last batch delivery of data. Although the system 102 is illustrated here as remotely monitoring various monitored systems 104a, 104b, 104c, it is to be understood that the system 102 alternatively can comprise multiple systems deployed locally at separate monitored systems. The locally deployed systems can be linked, for example, via a data communications network such that local monitoring can be coordinated. Moreover, a single system can be deployed locally to monitor multiple components of a monitored system in the same manner described.

Figure 2:
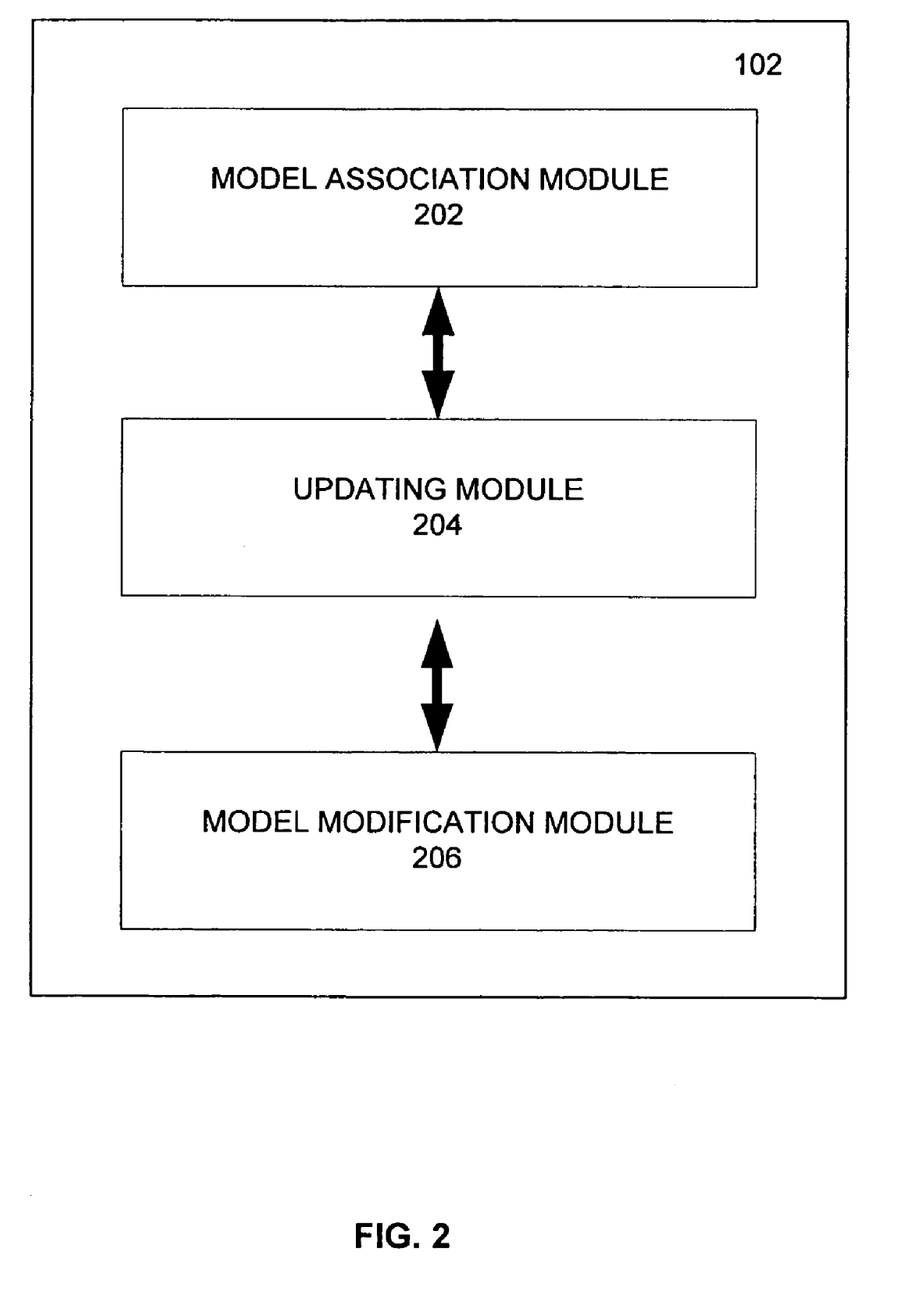
FIG. 2 is a schematic view of one embodiment of the system for updating system monitoring models shown in FIG. 1.

Referring additionally now to FIG. 2, a particular embodiment of the system 102 for updating a plurality of monitoring models is schematically illustrated. The system 102 illustratively includes a model association module 202, an updating module 204, and a model modification module 206, each in communication with the other. According to one embodiment, one or more of the modules are implemented in one or more dedicated hardwired circuits for performing the respective functions described below. Alternatively, one or more of the modules can be implemented in machine-readable code configured to run on a general-purpose or application-specific device. In still another embodiment, one or more of the modules are implemented in a combination of hardwired circuitry and machine-readable code.

Operatively, for each of the plurality of monitored systems 104a-c, the model association module 202 determines an association between the monitored systems and a plurality of estimation models constructed as described above. Thus, each particular one of the monitored systems 104a, 104b, 104c is associated with at least one such estimation model. One or more of the monitored systems 104a, 104b, 104c, however, can be associated by the model association module with more than one estimation model. For example, one monitored system 104a might be associated with a regression-type model alone. Another monitored system 104b might be associated with a regression model, a model based on auto-associative neural network, and/or a kernel regression model. Yet another monitored system 104c might be associated with only two such models.

Figure 3:
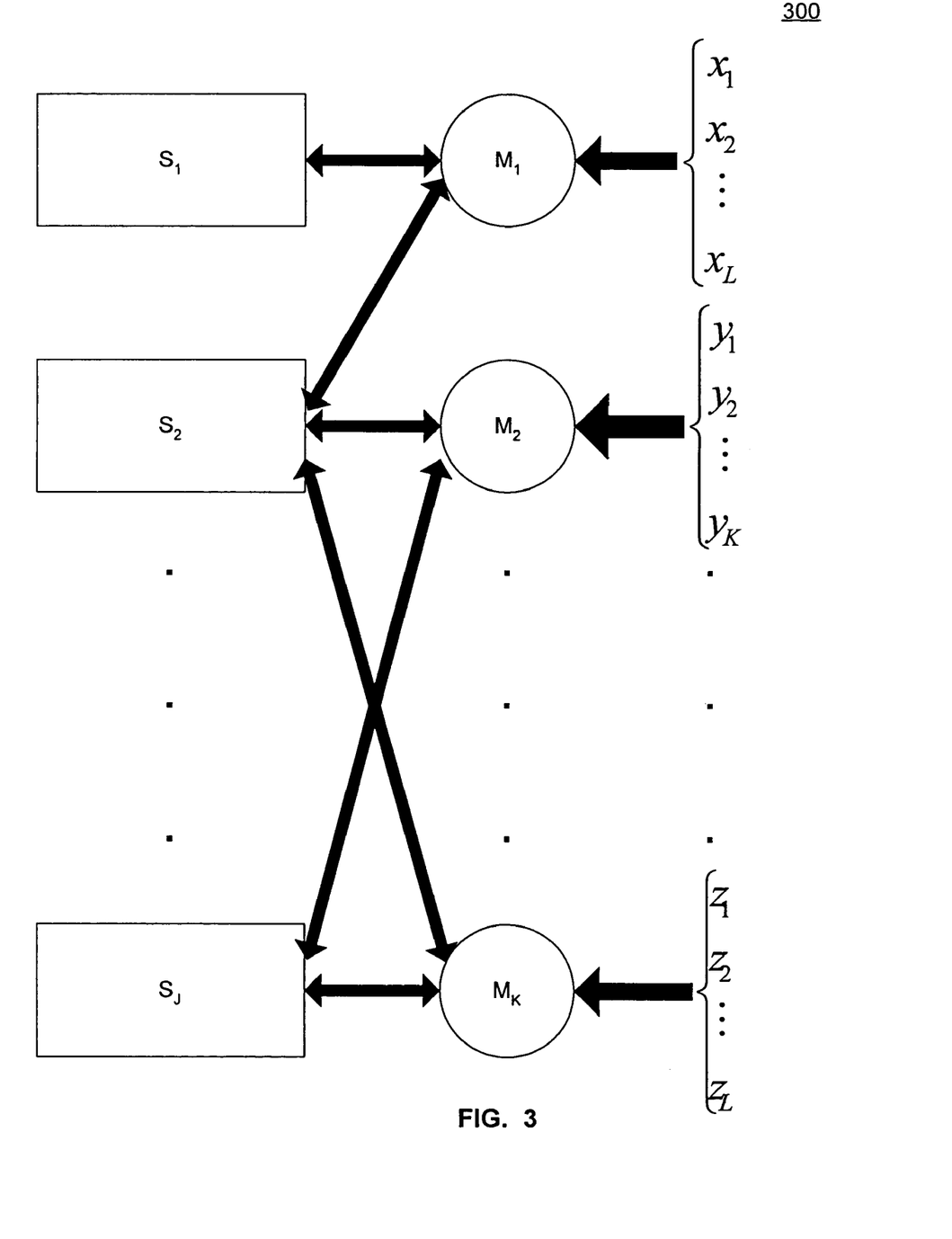
FIG. 3 is a schematic representation of a model association scheme, according to another embodiment of the invention.

A more generalized example of the model association scheme 300 performed by the model association module 202 is schematically illustrated in FIG. 3. The model association scheme 300 associates a plurality of J monitored systems, $S_1$, $S_2$, ..., $S_J$, with a plurality of K estimation models, $M_1$, $M_2$, ..., $M_K$. As depicted in this example, a first system, $S_1$, is modeled by and, therefore, associated with only one model, $M_1$. A second system, $S_2$, is associated with three different models, $M_1$, $M_2$, and $M_3$, which, though distinct models, are each applicable to the second system, $S_2$. The J-th system, $S_J$, is associated with the second of the K models, $M_2$, as well as the K-th model, each providing different modeling aspects of the system, $S_J$. From this example, it will be readily apparent that the model association scheme 300 performed by the model association module 202 is sufficiently general to encompass various other possible combinations. The particular associative combination, of course, is primarily dictated by the nature of the systems monitored as well as the different models used.

As further illustrated by the schematic of FIG. 3, each particular estimation model is based upon one of a plurality of distinct sets of estimation properties, $\{x_1, x_2, \ldots, x_L\}^T$, $\{y_1, y_2, \ldots, y_K\}^T$, and $\{z_1, z_2, \ldots, z_L\}^T$. The estimation properties can include, for example, a sensor list, sensor thresholds, training periods, an estimation model algorithm, and/or various algorithm parameters. All or some combination of particular ones of these estimation properties can be applicable to each of the different models. Accordingly, even though one or more of the estimation properties may apply with respect to more than one model, each set of estimation properties uniquely corresponds to a particular estimation model.

The updating module 204 updates one or more of the estimation properties in response to user input. When an estimation property is updated, the updating module 204 then propagates the updated estimation property to each estimation model that corresponds to a distinct set containing the estimation property, which has now been updated. An updated estimation property replaces the pre-updated version in the set.

Once one or more updated estimation properties is propagated by the updating module 204 to the one or more estimation models that correspond to a unique set of estimation properties that include at least one of the now-updated estimation properties, those estimation models to which are propagated updated estimation properties need to be revised or updated. The modifying is performed by the model modification module 206, which modifies each estimation model that corresponds to a distinct set containing at least one estimation property that is updated. As described more particularly below, an estimation model that has been modified in response to an updating of one or more of the estimation properties contained in the set of properties corresponding to the estimation model can subsequently be "retrained" to create new sensor-generated sensor vectors.

In a particular instance, it may be that an estimation model used to model one or more of the monitored systems 104a, 104b, 104c is deemed to perform insufficiently with respect to one of the monitored systems. This could be due, for example, to a change in the underlying structure of one of the monitored systems 104a, 104b, 104c. Conversely, changes in system structure or other circumstances may lead to a model becoming better suited for monitoring one of the monitored systems 104a, 104b, 104c to which the model formerly was not applied. Additionally, new models may be developed for use with one or more of the monitored systems 104a, 104b, 104c.

Thus, according to another embodiment of the invention, the model association module 202 is configured to update associations between the monitored systems and the associated estimation models in response to changes in system structure and other circumstances, as well as to the addition of new models or elimination of old ones.

Figure 4:
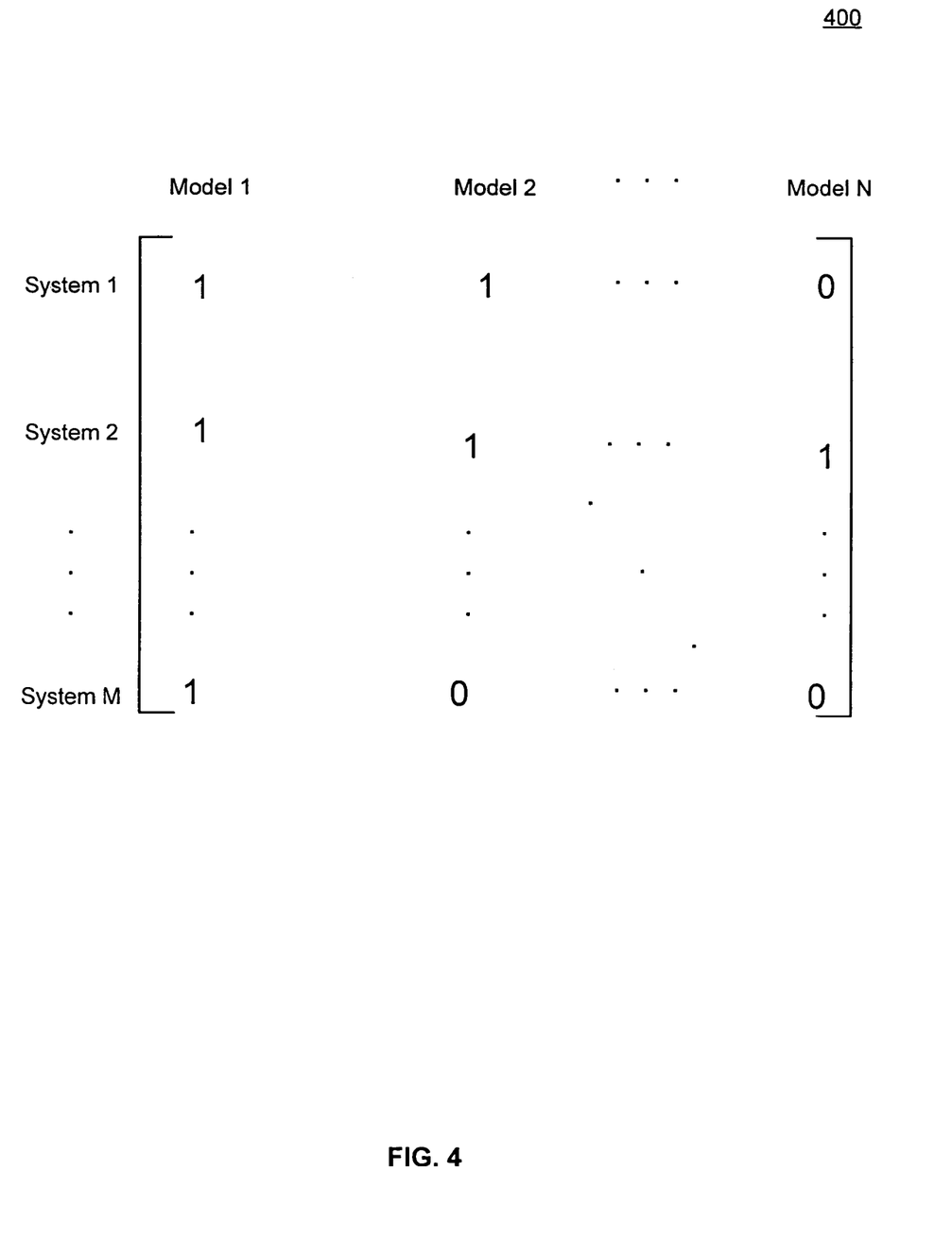
FIG. 4 is a schematic representation of a fleet table constructed and modified according to still another embodiment of the invention.

Referring additionally now to FIG. 4, the associations between M different systems and N estimation models, at any given instance, can be concisely presented by a fleet table 400. The fleet table 400 can be implemented as an M×N matrix, with M being an integer greater than one corresponding to the number of monitored systems, and N being an integer equal to the number of estimation models associated with the different monitored systems. An association between the i-th system and the j-th model is represented by the i,j-th element of the matrix being assigned a value of 1; in the absence of an association, the i,j-th element of the matrix is zero. The fleet table 400 is easily modified by changing ones and zeros as the model association module 202 updates associations in response to changing circumstances such as system structural changes and/or the addition or elimination of estimation models.

Figure 5:
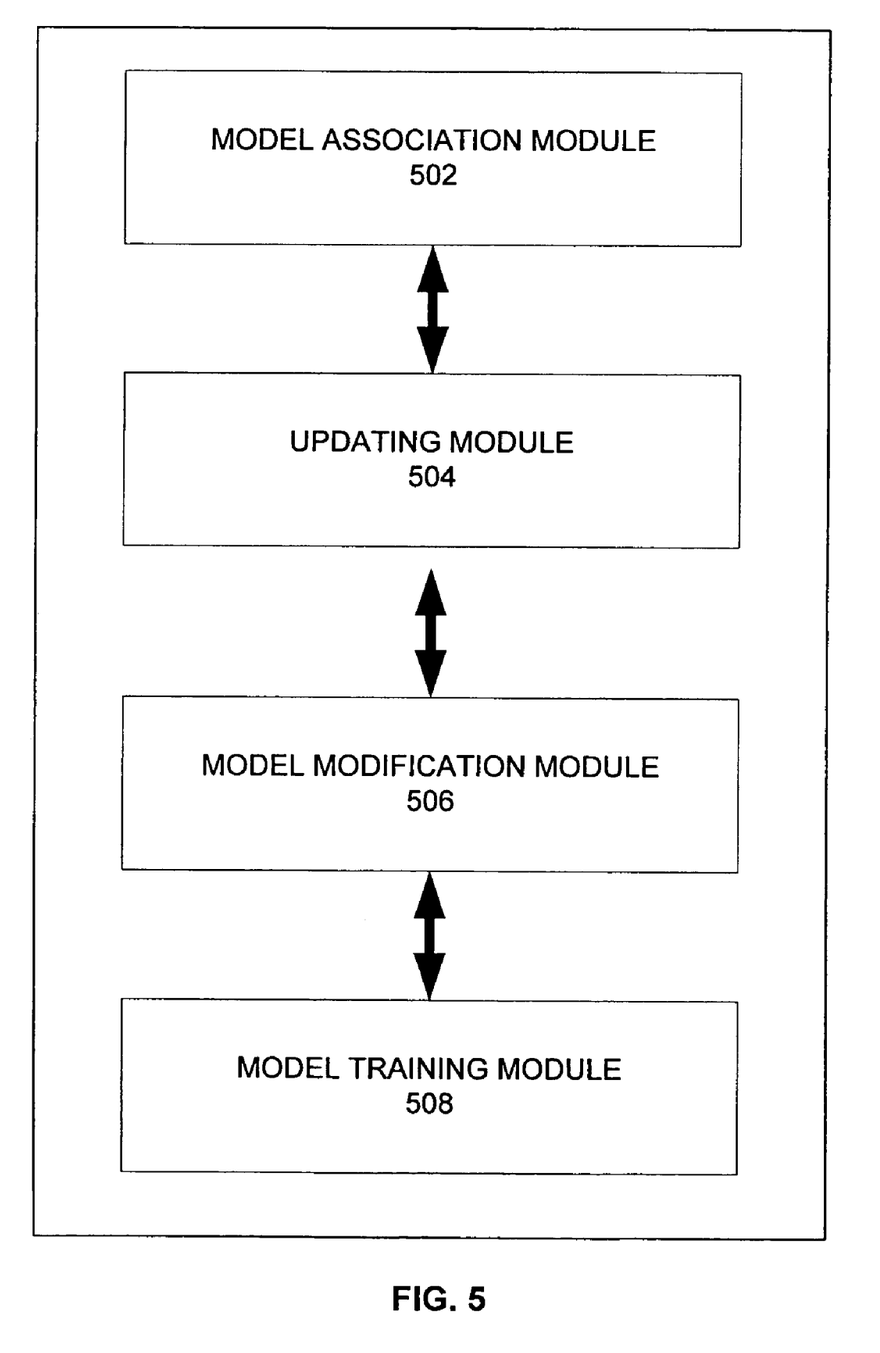
FIG. 5. is a schematic view of a system for updating system monitoring models, according to yet another embodiment of the invention.

Referring now to FIG. 5, an alternative embodiment of a system 500 for updating a plurality of monitoring models further includes a training module 508. The training module 508 trains system-specific versions of each estimation model for each monitored system. The training is performed using sensor data generated by the sensors communicatively linked to a particular system for which a particular system-specific version of an estimation model is trained. The training module 508 is illustratively in communication with a model association module 502, an updating module 504, and a model modification module 506.

The model association module 502, updating module 504, and model modification module 506 each perform the functions previously described. Accordingly, in yet another embodiment, the training module 508 can be configured to cooperatively function with each of the other modules to retrain each system-specific version of each estimation model that has been modified as a result of the operations performed by the other modules.

Figure 6:
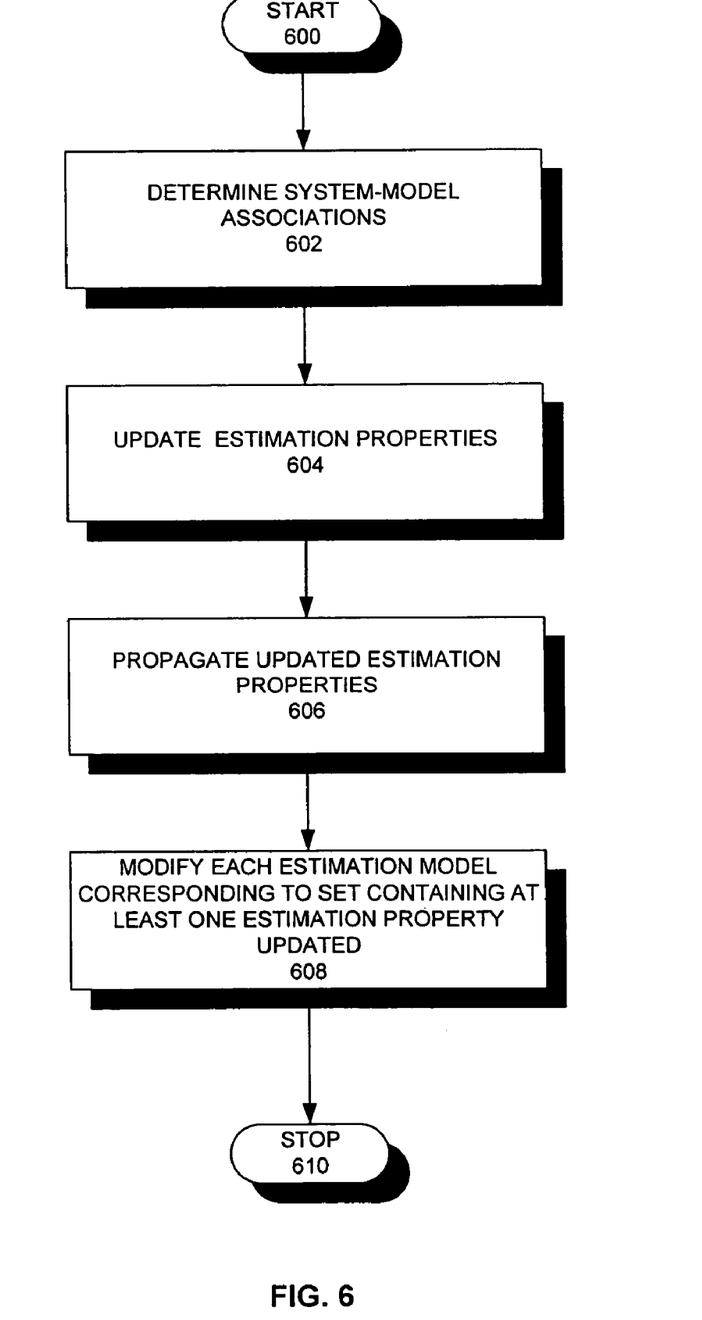
FIG. 6 is a flowchart of exemplary steps for a method of updating a plurality of system monitoring models, according to still another embodiment of the invention.

Another embodiment of the invention is an electronically-implemented model association method 600 for updating estimation models, as schematically illustrated by the exemplary steps of FIG. 6. Each of the estimation models can comprise one of various models used for inferential sensing as already described. The method 600, at step 602, illustratively includes determining an association between a particular monitored system and at least one of a plurality of estimation models. Each of the estimation models is based upon one of a plurality of distinct sets of estimation properties, and each set uniquely corresponds to a particular estimation model.

The method 600 additionally includes updating at least one of the estimation properties at step 604. At step 606, the method 600 further includes propagating updated estimation properties to each estimation model that corresponds to a distinct set containing the at least one estimation property that is updated. The method 600 includes, at step 608, modifying each estimation model that corresponds to a distinct set containing at least one estimation property that is updated. The method illustratively concludes at step 610.

According to yet another embodiment, the method 600 can include updating at least one association between a monitored system and an associated estimation model. The additional step can be optionally performed at any point during a procedure for updating a plurality of system monitoring models according to the steps already described.

Figure 7:
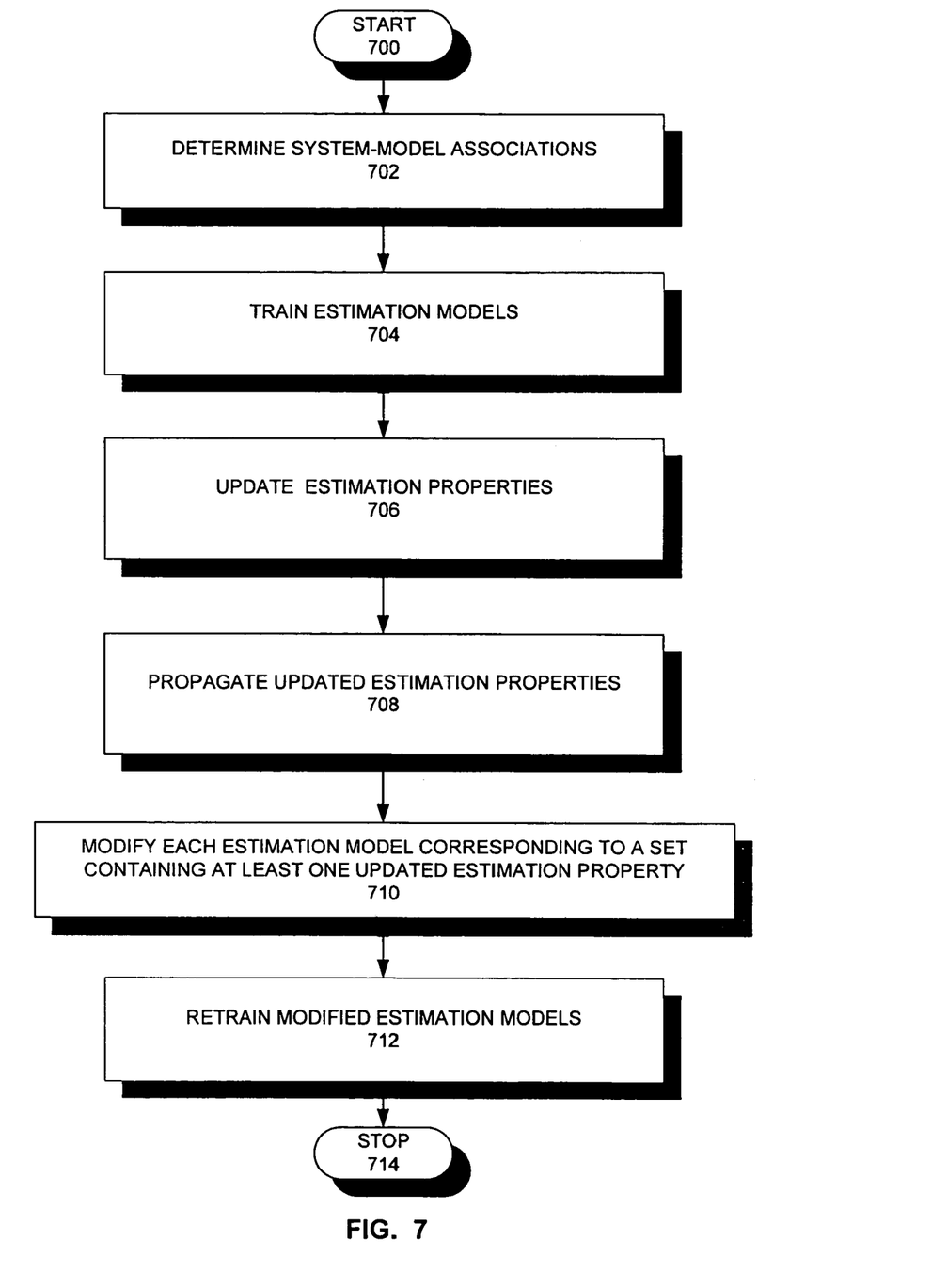
FIG. 7 is a flowchart of exemplary steps for a method of updating a plurality of system monitoring models, according to yet another embodiment of the invention.

Referring now to the flowchart of FIG. 7, an electronically-implemented model association method 700 according to yet another embodiment is illustrated. The method 700, at step 702, illustratively includes determining an association between a particular monitored system and at least one of a plurality of estimation models. Each associated estimation is trained at step 704. Each model is trained individually for each system that it models using sensor vectors supplied by sensors communicatively linked to the particular system. Each model so trained, defines a system-specific version of the estimation model corresponding to the system for which it is trained.

The method 700 further includes updating at least one of the estimation properties at step 706. The method 700 also includes, at step 708, propagating updated estimation properties to each estimation model that corresponds to a distinct set containing the at least one estimation property that is updated. The method 700 includes, at step 710, modifying each estimation model that corresponds to a distinct set containing at least one estimation property that is updated. At step 712, the method 700 includes retraining each system-specific version of each estimation model that has been modified. As with the training of a model, the retraining of the model is based upon sensor data generated by sensors communicatively linked to a particular system for which a particular system-specific version of an estimation model is retrained. The method illustratively concludes at step 712.

As noted throughout, the invention can be realized in hardware, software, or a combination of hardware and software. The invention also can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. An electronically-implemented model association method for updating estimation models used for system monitoring, the method comprising:

for each of a plurality of monitored systems, determining an association between a particular monitored system and at least one of a plurality of estimation models, wherein each estimation model is based upon one of a plurality of distinct sets of estimation properties, each set of estimation properties including at least one among a sensor list, sensor thresholds, training period, and estimation model algorithm, and wherein each set uniquely corresponds to a particular estimation model;

updating at least one of the estimation properties;
propagating the at least one updated estimation property to each estimation model that corresponds to a distinct set containing the at least one estimation property that is updated;
modifying each estimation model that corresponds to a distinct set containing the at least one estimation property that is updated;
updating an association between one or more estimation models and at least one of the plurality of monitored systems in response to a structure of at least one monitored system changing; and
retaining a system-specific version of each estimation model that is modified.

2. The method of claim 1, further comprising training a system-specific version of each estimation model for each monitored system, wherein the training is based upon sensor data generated by sensors communicatively linked to a particular system for which a particular system-specific version of an estimation model is trained.

3. The method of claim 2, further comprising retraining each system-specific version of each estimation model that is modified, wherein the retraining is based upon sensor data generated by sensors communicatively linked to a particular system for which a particular system-specific version of an estimation model is retrained.

4. The method of claim 3, wherein retraining is based upon a least-squares estimation.

5. The method of claim 1, further comprising generating a fleet table to represent the associations between the plurality of monitored systems and the plurality of estimation models.

6. The method of claim 5, wherein the fleet table comprises an M×N matrix, M being an integer greater than one comprising a number of monitored systems, and N being an integer equal to a number of estimation models.

7. A system for updating a plurality of monitoring models, the system comprising:
a model association module that for each of a plurality of monitored systems determines an association between a particular monitored system and at least one of a plurality of estimation models, wherein each estimation model is based upon one of a plurality of distinct sets of estimation properties, each set of estimation properties including at least one among a sensor list, sensor thresholds, training period, and estimation model algorithm, and wherein each set uniquely corresponds to a particular estimation model;
an updating module that updates at least one of the estimation properties and propagates the at least one updated estimation property to each estimation model that corresponds to a distinct set containing the at least one estimation property that is updated; and
a model modification module that modifies each estimation model that corresponds to a distinct set containing the at least one estimation property that is updated;
the model modification module is configured to update an association between one or more estimation models and at least one of the plurality of monitored systems in response to a structure of at least one monitored system changing, and to cause a system-specific version of each estimation model that is modified to be electronically stored.

8. The system of claim 7, further comprising a training module configured to train a system-specific version of each estimation model for each monitored system based upon sensor data generated by sensors communicatively linked to a particular system for which a particular system-specific version of an estimation model is trained.

9. The system of claim 8, wherein the training module is further configured to retrain each system-specific version of each estimation model that is modified.

10. The system of claim 7, wherein the system is deployed at a location remote from the plurality of monitored systems.

11. A computer-readable storage medium comprising computer instructions for:
determining for each of a plurality of monitored systems an association between a particular monitored system and at least one of a plurality of estimation models, wherein each estimation model is based upon one of a plurality of distinct sets of estimation properties, each set of estimation properties including at least one among a sensor list, sensor thresholds, training period, and estimation model algorithm, and wherein each set uniquely corresponds to a particular estimation model;
updating at least one of the estimation properties;
propagating at least one updated estimation property to each estimation model that corresponds to a distinct set containing the at least one estimation property that is updated;
modifying each estimation model that corresponds to a distinct set containing the at least one estimation property that is updated;
updating an association between one or more estimation models and at least one of the plurality of monitored systems in response to a structure of at least one monitored system changing; and
retaining a system-specific version of each estimation model that is modified.

12. The computer-readable storage medium of claim 11, further comprising computer instructions for training a system-specific version of each estimation model for each monitored system, wherein the training is based upon sensor data generated by sensors communicatively linked to a particular system for which a particular system-specific version of an estimation model is trained.

13. The computer-readable storage medium of claim 12, further comprising computer instructions for retraining each system-specific version of each estimation model that is modified, wherein the retraining is based upon sensor data generated by sensors communicatively linked to a particular system for which a particular system-specific version of an estimation model is retrained.

14. The computer-readable storage medium of claim 13, wherein the computer instructions for refraining comprise instructions for performing estimations based upon a least-squares method.

* * * * *